Feb. 10, 1925.
W. M. MANSFIELD
1,525,616
COMBINATION LUG AND CLEAT FOR TRACTOR WHEELS
Filed May 11, 1923    2 Sheets-Sheet 1
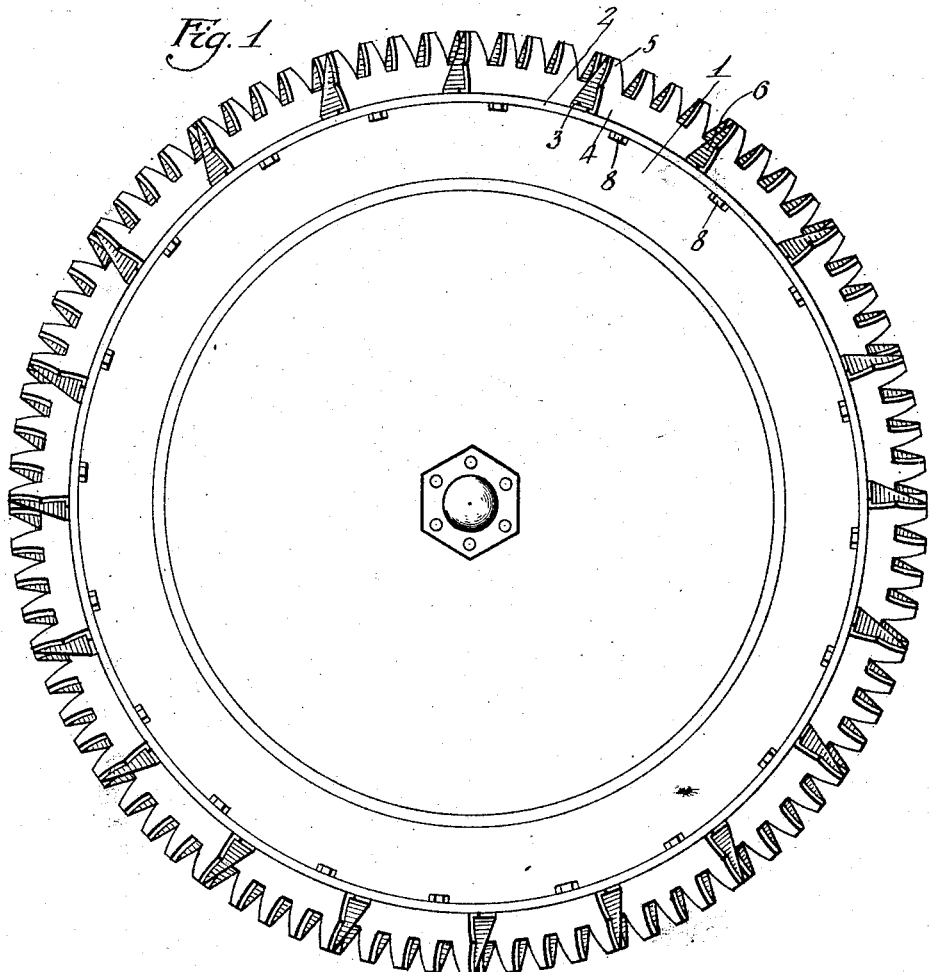
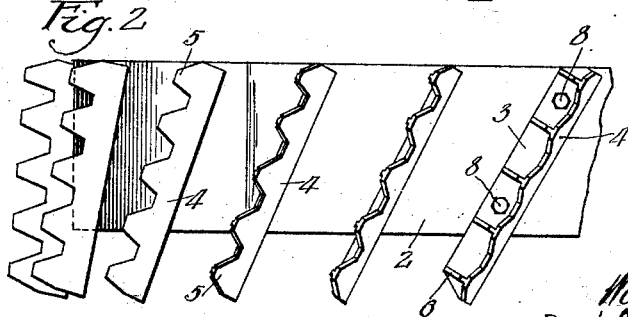
Inventor
Warren M. Mansfield Feb. 10, 1925.  
W. M. MANSFIELD  
1,525,616  
COMBINATION LUG AND CLEAT FOR TRACTOR WHEELS  
Filed May 11, 1923 2 Sheets-Sheet 2
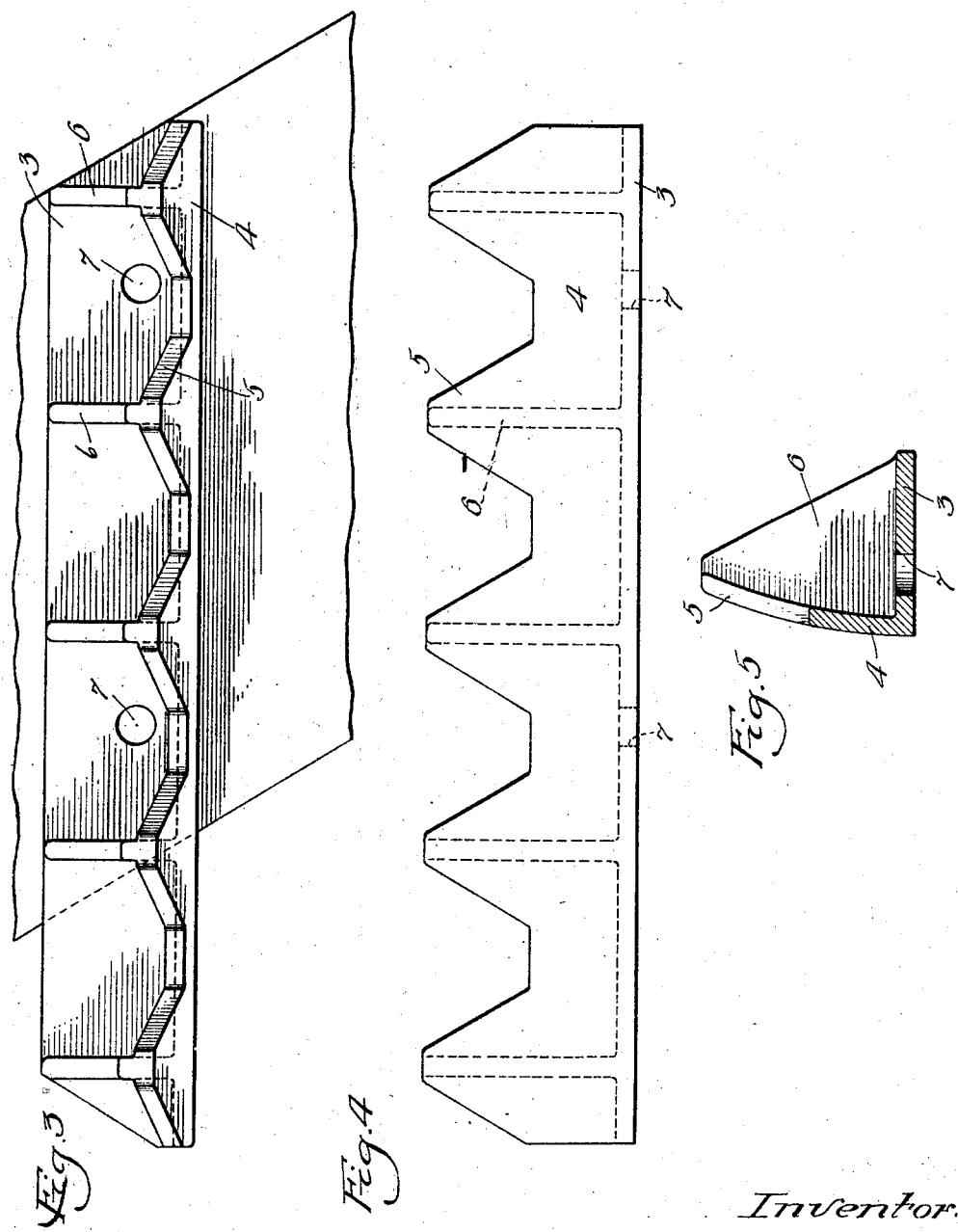
Inventor:
Warren M. Mansfield Patented Feb. 10, 1925.

1,525,616

UNITED STATES PATENT OFFICE.

WARREN M. MANSFIELD, OF MOLINE, ILLINOIS, ASSIGNOR TO MOLINE PLOW COMPANY, INCORPORATED, OF MOLINE, ILLINOIS, A CORPORATION OF VIRGINIA.

COMBINATION LUG AND CLEAT FOR TRACTOR WHEELS.

Application filed May 11, 1923. Serial No. 638,208.

*To all whom it may concern:*

Be it known that I, WARREN M. MANSFIELD, a citizen of the United States, residing at Moline, county of Rock Island, State of Illinois, have invented certain new and useful Improvements in Combination Lugs and Cleats for Tractor Wheels, of which the following is a specification.

The invention relates to a combination lug and cleat for tractor wheels.

One of the difficult problems encountered in the use of tractors is that of securing the proper traction for the wheels under the various conditions that are encountered. When the tractor is used in soft ground, some kind of lugs or gripping devices must be employed which will give the machine tractive effort and which will not clog with soft dirt, trash, etc. If the lugs are designed for this use only, they are often not suitable for use in other kinds of ground, where such deep penetration of the lugs is not required. Also, they are not suitable for use in hard ground because it is not desirable to have the tractor bump along on long projecting lugs, which not only jar the tractor, but also damage the surface of the ground, such as a surfaced road, over which the tractor is moved.

The present invention is directed to a combination lug and cleat suitable for universal use in soft as well as hard or medium hard ground.

The general object of the invention is to provide an improved tractor lug and cleat.

Other and more specific advantages will appear from the specification and drawings.

An embodiment of the invention is shown in the drawings in which,

Figure 1 is a side elevation of a tractor wheel with the cleats attached.

Figure 2 is a partial plan view.

Figure 3 is a plan view of one of the cleats with a portion of the rim of the wheel illustrated.

Figure 4 is a side elevation of one of the cleats.

Figure 5 is a cross section of the cleat.

The cleats are illustrated as connected to a tractor wheel 1 having a rim 2. The construction of this wheel and the number of cleats employed may be varied to suit the requirements. The cleats are preferably longer than the wheel is wide and they are bolted to the rim of the wheel at an angle, as illustrated in Figure 2, so that the outer end of one cleat is very nearly opposite the inner end of the adjacent cleat to thereby make the tread a continuous one, that is, instead of the wheel bumping from one cleat to another, it rolls smoothly from one cleat to another because as soon as the point of contact leaves one cleat, the end of the next cleat is in position to immediately contact the ground.

The cleat comprises an angle plate having a base or body portion 3, a side surface 4, a plurality of teeth 5, and a plurality of strengthening ribs 6. It is preferably formed by drop forging so that it will be tough and resistant to wear. The ends of the teeth 5 are preferably hardened so as to increase their life and to prevent them from wearing away quickly.

The base of the cleat is provided with openings 7 for the reception of bolts 8 by means of which the cleat is clamped to the wheel rim.

The face of the side 4 and the teeth 5 is curved, as illustrated in Figure 5 and the cleats are mounted so that this face curves away from the direction of rotation of the wheel. The advantage of shaping the surface this way is that the lug tends to pack the earth when it strikes it, thereby securing better gripping action than if it were straight or curved in the other direction so as to tear the earth and remove it.

The side surface 4 extends about half way of the height of the lug and it provides full surface for contacting the ground when the tractor is used in soft soil. For example, when used in soft soil, the lugs will penetrate beyond the depth of the teeth 5 and the surface 4 will come into action to give the effect of a full angle cleat. A good gripping action is thus obtained in soft ground. When the tractor is used on semi-hard ground, it will penetrate only to the depth of the teeth 5, which will give it sufficient gripping action and the effect of having an angle lug will not be had.

When the tractor is used on very hard ground, it will run along on the ends of the teeth 5, but these are positioned in a row and the cleats are at an angle so that the tractor moves along smoothly on hard ground.

It will thus be observed that there is combined in this one cleat, the advantages of spud teeth as well as the advantages of angle cleats. When it is desired to use the tractor in soft ground, where cleats are most efficient, the lug swings down to a position where it acts as a cleat. When it is desired to use the tractor in ground where teeth are not desirable, the lug will swing only to the depth of the teeth and the teeth become available without any of the disadvantages of a cleat appearing. When it is desired to use the tractor on hard ground, the advantages of an angle cleat are available for smooth traction in spite of the fact that the angles themselves have teeth on them.

It is to be understood that the construction shown is for purposes of illustration and that variations may be made in it without departing from the spirit and scope of the invention as defined by the claims.

I claim:

1. A combination lug and cleat for tractor wheels comprising an angle member having one of its sides provided with openings so that it may be connected to a tractor wheel, the other side of the angle member being curved so as to present a convex surface in the direction of rotation of a wheel to which the cleat is attached, the outer edge of said second side having teeth which give a gripping action in hard ground and which cooperate with the remainder of the surface of the second side of the angle member to give a combined gripping action in soft ground.

2. A combination lug and cleat for tractor wheels comprising an angle member having one side adapted to be connected to a tractor wheel, the other side projecting outwardly and having teeth formed in its outer edge, reinforcing ribs behind each of the teeth, said teeth serving to give a gripping action in hard ground, and in combination with the continuous surface of the projecting side of the angle member, serving to give a combined gripping action in soft ground.

In testimony whereof, I affix my signature.

WARREN M. MANSFIELD.